US011235505B2

(12) United States Patent
Hoshino et al.

(10) Patent No.: US 11,235,505 B2
(45) Date of Patent: Feb. 1, 2022

(54) METHOD FOR MANUFACTURING LIQUID-CONTAINING CONTAINER

(71) Applicant: YOSHINO KOGYOSHO CO., LTD., Tokyo (JP)

(72) Inventors: Hideaki Hoshino, Tokyo (JP); Yuichi Okuyama, Tokyo (JP); Kenichi Suyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 17/042,052

(22) PCT Filed: Mar. 6, 2019

(86) PCT No.: PCT/JP2019/008955
§ 371 (c)(1),
(2) Date: Sep. 25, 2020

(87) PCT Pub. No.: WO2019/202865
PCT Pub. Date: Oct. 24, 2019

(65) Prior Publication Data
US 2021/0039302 A1    Feb. 11, 2021

(30) Foreign Application Priority Data

Apr. 20, 2018  (JP) .............................. JP2018-081692
Nov. 30, 2018  (JP) .............................. JP2018-225969

(51) Int. Cl.
*B29C 49/12*       (2006.01)
*B29C 49/46*       (2006.01)
(Continued)

(52) U.S. Cl.
CPC .............. *B29C 49/12* (2013.01); *B29C 49/46* (2013.01); *B29C 2049/1228* (2013.01);
(Continued)

(58) Field of Classification Search
CPC .............. B29C 49/46; B29C 2049/465; B29C 2049/4655; B29C 2049/4664;
(Continued)

(56) References Cited

U.S. PATENT DOCUMENTS 9,610,744 B2 *   4/2017  Sato ........................ B29C 49/46
2018/0290366 A1 * 10/2018  Okuyama ................ B65D 1/00
2020/0346390 A1 * 11/2020  Okuyama ............... B29C 49/12

FOREIGN PATENT DOCUMENTS

GN       107922077 A       4/2018
JP       H02-296694 A      12/1990
(Continued)

OTHER PUBLICATIONS

May 21, 2019 International Search Report issued in International Patent Application No. PCT/JP2019/008955.
(Continued)

*Primary Examiner* — Robert B Davis
(74) *Attorney, Agent, or Firm* — Oliff PLC

(57) ABSTRACT

A liquid container manufacturing method includes: a liquid blow molding step of molding a preform into a liquid container; and a headspace formation step of forming a headspace, by discharging, in a state in which a liquid supply path is closed, a liquid out of the liquid container through a discharge port, the discharge accomplished by drawing-in by a liquid drawing source. In the headspace formation step, a pressurized gas is supplied from a pressurized gas supply source into the liquid container through a gas supply port to thereby assist the discharge, by the drawing-in, of the liquid out of the liquid container through the discharge port, and, when a pressure in a discharge path has increased to a set value, the supply of the pressurized gas by the pressurized gas supply source is stopped.

9 Claims, 10 Drawing Sheets

(51) Int. Cl.
  *B29K 701/12* (2006.01)
  *B29L 31/00* (2006.01)

(52) U.S. Cl.
  CPC .... *B29C 2049/465* (2013.01); *B29K 2701/12* (2013.01); *B29L 2031/7158* (2013.01)

(58) Field of Classification Search
  CPC .... B29C 2049/1228; B29C 2049/5803; B29C 2049/5893
  See application file for complete search history.

(56) References Cited

FOREIGN PATENT DOCUMENTS

| | | | | |
|---|---|---|---|---|
| JP | 5806929 | B2 | 11/2015 | |
| JP | 2017-094685 | A | 6/2017 | |
| WO | WO-2019058813 | A1 * | 3/2019 | ............. B29C 49/46 |

OTHER PUBLICATIONS

Oct. 11, 2021 Office Action issued in Chinese Patent Application No. 201980024300.4.
Oct. 18, 2021 Extended European Search Report issued in European Patent Application No. 19788946.2.

\* cited by examiner

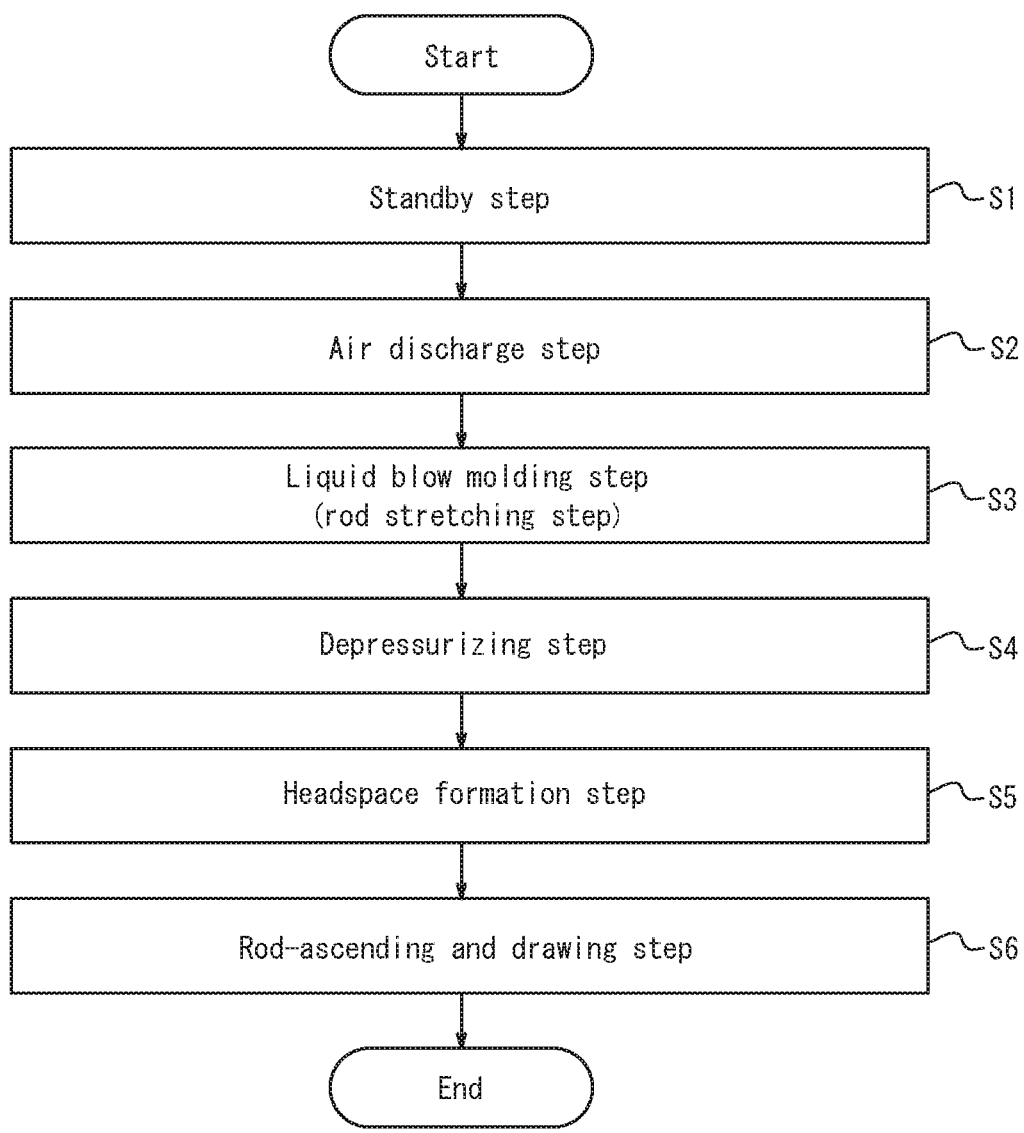

METHOD FOR MANUFACTURING LIQUID-CONTAINING CONTAINER

TECHNICAL FIELD

This disclosure relates to a liquid container manufacturing method for manufacturing, from a preform, a liquid container containing a content liquid.

BACKGROUND

Synthetic resin containers, typical examples of which include a polypropylene (PP) bottle and a polyethylene terephthalate (PET) bottle, have been used to contain, as content liquids, a variety of liquids, such as beverages, cosmetic products, pharmaceutical products, detergents, and toiletries including shampoo. Such a container is typically manufactured by blow molding a preform which has been formed by a thermoplastic synthetic resin material as described above.

For blow molding the preform into the container, a known blow molding device may use a pressurized liquid, instead of pressurized air, as a pressurizing medium to be supplied into the preform.

Patent Literature 1, for example, describes a liquid blow molding method in which the synthetic resin preform, after having been heated in advance to a temperature at which stretchability is achieved, is placed in a mold used for blow molding, and the liquid which is pressurized to a pressurized pressure by using a pressurizing unit, such as a pump, is supplied into the preform through a blow nozzle. In this way, the synthetic resin preform is molded into the container having a predetermined shape conforming to a cavity of the mold.

By using, as the liquid to be supplied to the preform, the content liquid that is to be contained in the container as a final product, the above liquid blow molding method allows molding of the container to occur concurrently with filling of the content liquid to the container to manufacture the liquid container containing the content liquid. The liquid container manufacturing method using the liquid blow molding therefore omits the step of filling the content liquid to the molded container, thereby allowing low-cost manufacturing of the liquid container.

CITATION LIST

Patent Literature

PL 1: JP 5806929 B2

SUMMARY

Technical Problem

The conventional liquid blow molding method generally requires a process of forming a headspace having a desired dimension in the molded container. One likely method to form the headspace is, for example, to draw in, immediately after the liquid container has been molded, the liquid inside the container through the blow nozzle to create a negative pressure inside the container and subsequently expose the inside of the container to the atmosphere and introduce air into the container, thereby forming the headspace. However, the liquid that is present inside the container immediately after the molding is entrained with air that used to be present inside the preform. The above method therefore inevitably introduces the liquid entrained with air to a liquid supply path communicating with the blow nozzle. Air entrapped in the supply path may cause an issue of deterioration in stability of molding conditions, moldability of the container, and the like.

It would therefore be helpful to provide a liquid container manufacturing method that is capable of manufacturing the liquid container with high precision to provide a predetermined capacity and shape and at low cost.

Solution to Problem

One aspect of the present disclosure resides in a liquid container manufacturing method for manufacturing, from a closed-bottom tubular-shaped preform, a liquid container containing a content liquid by using a nozzle unit and a mold. The nozzle unit includes: a blow nozzle that defines a liquid supply port positioned at a termination of a liquid supply path connected to a pressurized liquid supply source; a discharge rod including a discharge port connected to a liquid drawing source through a discharge path; and a gas supply port that is provided in the blow nozzle and that is connected to a pressurized gas supply source. The liquid container manufacturing method includes: a liquid blow molding step of molding the preform into the liquid container having a shape conforming to an inner surface of the mold, by supplying a pressurized liquid into the preform through the liquid supply port by the pressurized liquid supply source; and a headspace formation step of forming a headspace in the liquid container, by discharging, in a state in which the liquid supply path is closed, the liquid out of the liquid container through the discharge port positioned below the liquid supply port, the discharge accomplished by drawing-in by the liquid drawing source. In the headspace formation step, a pressurized gas is supplied from the pressurized gas supply source into the liquid container through the gas supply port to thereby assist the discharge, by the drawing-in, of the liquid out of the liquid container through the discharge port, and, when a pressure in the discharge path has increased to a set value, the supply of the pressurized gas by the pressurized gas supply source is stopped.

In a preferred embodiment of the present liquid container manufacturing method configured as above, in the headspace formation step, when a value detected by a pressure gauge provided in the discharge path has increased to the set value, the supply of the pressurized gas by the pressurized gas supply source is stopped.

In another preferred embodiment of the present liquid container manufacturing method configured as above, the pressurized liquid supply source is configured by a pump operable in both pressurizing and drawing directions, and the liquid container manufacturing method further includes a depressurizing step, performed between the liquid blow molding step and the headspace formation step, of reducing a pressure inside the liquid container, by operating the pump in the drawing direction in a state in which the liquid supply path is opened.

In yet another preferred embodiment of the present liquid container manufacturing method configured as above, the pressurized liquid supply source and the liquid drawing source are configured in common by a pump operable in both pressurizing and drawing directions, the liquid blow molding step is performed by operating the pump in the pressurizing direction, and the headspace formation step is performed by operating the pump in the drawing direction.

In yet another preferred embodiment of the present liquid container manufacturing method configured as above, the operation of the pump in the drawing direction in the headspace formation step is stopped according to the pressure in the discharge path.

In yet another preferred embodiment of the present liquid container manufacturing method configured as above, the discharge rod is configured to open and close the discharge port, the liquid blow molding step is performed in a state in which the discharge port is closed, and the headspace formation step is performed in a state in which the discharge port is opened.

In yet another preferred embodiment of the present liquid container manufacturing method configured as above, the liquid container manufacturing method further includes a rod stretching step, performed at least one of during a course of the liquid blow molding step or prior to the liquid blow molding step, of stretching the preform in an axial direction by using the discharge rod as a stretching rod.

In yet another preferred embodiment of the present liquid container manufacturing method configured as above, the liquid container manufacturing method further includes an air discharge step, performed prior to the liquid blow molding step, of discharging air inside the preform to outside, by supplying the liquid into the preform.

In yet another preferred embodiment of the present liquid container manufacturing method configured as above, the nozzle unit further includes a sealing body configured to open and close the liquid supply path, the discharge rod penetrates the sealing body and is displaceable relative to the sealing body, the liquid blow molding step is performed by causing the sealing body to open the liquid supply path, and the headspace formation step is performed in a state in which the sealing body closes the liquid supply path.

Advantageous Effect

The present disclosure provides a liquid container manufacturing method that is capable of manufacturing the liquid container with high precision to provide a predetermined capacity and shape and at low cost.

BRIEF DESCRIPTION OF THE DRAWINGS

In the accompanying drawings:

FIG. 10 is a flowchart of a manufacturing process flow of the liquid container manufacturing method according to the embodiment of the present disclosure.

DETAILED DESCRIPTION

With reference to the drawings, the present disclosure is described in more details by illustration below.

Figure 1:
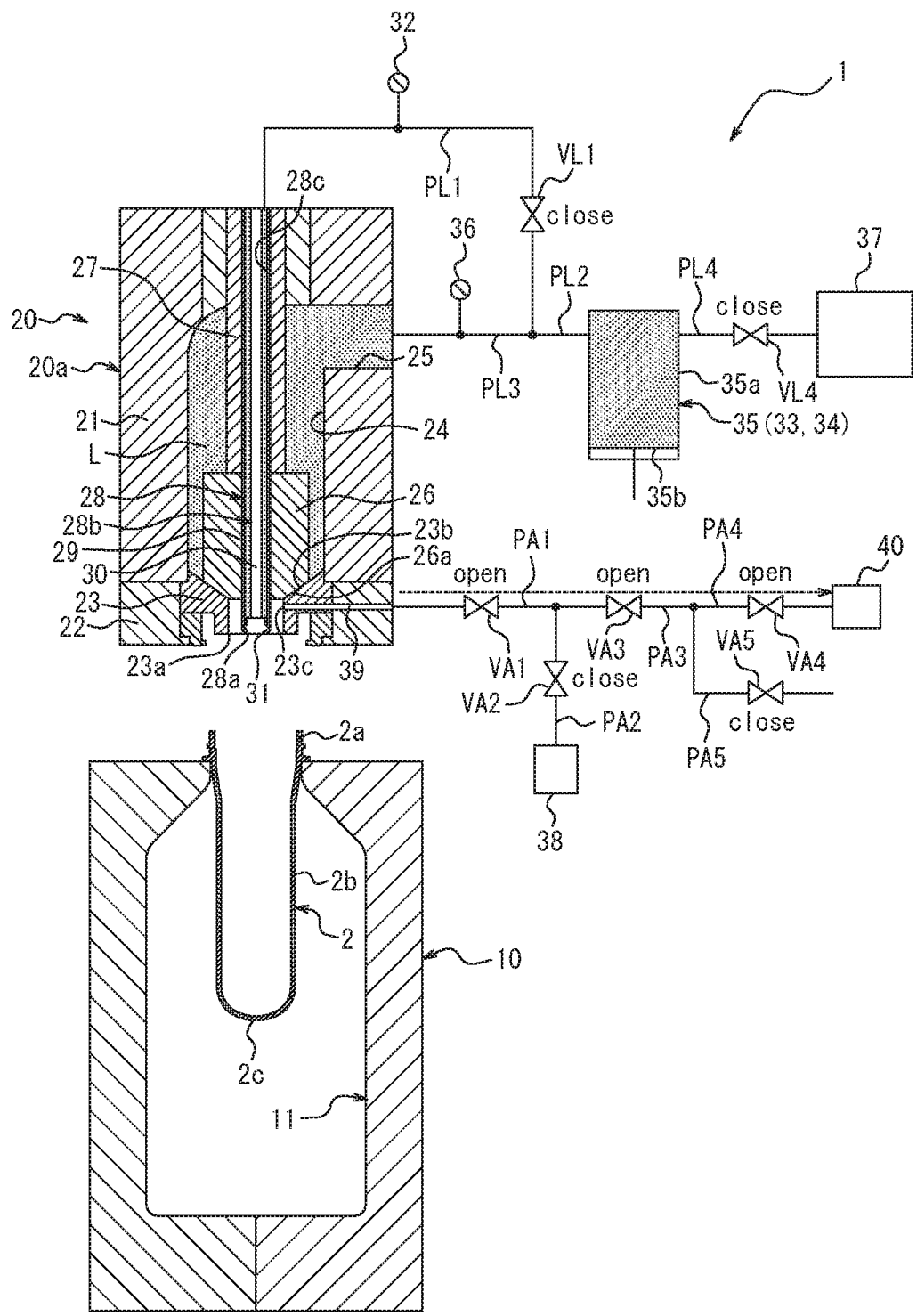
FIG. 1 illustrates an example of a liquid container manufacturing apparatus used for a liquid container manufacturing method according to an embodiment of the present disclosure, the liquid container manufacturing apparatus in a standby step.

A liquid container manufacturing method according to an embodiment of the present disclosure may be implemented by using, for example, a liquid container manufacturing apparatus 1, which is configured as illustrated in FIG. 1.

The liquid container manufacturing apparatus 1 of FIG. 1 manufactures, from a synthetic resin preform 2, a liquid container C (refer to FIG. 9), which contains a content liquid. Examples of the (content) liquid L, which is to be contained in the liquid container C, may include a variety of liquids L, such as beverages, cosmetic products, pharmaceutical products, detergents, and toiletries including shampoo.

The preform 2, as an adoptable example, has been formed by a thermoplastic resin material, such as polypropylene (PP) and polyethylene terephthalate (PET), in a closed-bottom tubular shape having a cylindrical-shaped mouth 2a, which serves as an opening end, a cylindrical-shaped trunk 2b, which is contiguous with the mouth 2a, and a bottom 2c, which closes a lower end of the trunk 2b.

Although not illustrated in details, the mouth 2a is provided, on an outer wall surface thereof, with an engagement protrusion which allows a closing cap (which is not illustrated) to be attached to the mouth 2a of the molded liquid container C by plugging (i.e., undercut engagement). Additionally, instead of the engagement protrusion, a male screw may also be provided on the outer wall surface of the mouth 2a, and the closing cap may be attached to the mouth 2a by screw connection.

The liquid container manufacturing apparatus 1 includes a mold 10, which is used for blow molding. The mold 10 has a cavity 11, which has a shape corresponding to a final shape, such as a bottle shape, of the liquid container C. The cavity 11 is open upward at an upper surface of the mold 10. The preform 2 is placed in the mold 10, with the trunk 2b and the bottom 2c being positioned inside the cavity 11 of the mold 10 and with the mouth 2a protruding upward from the mold 10.

The mold 10 may be opened into left and right mold halves, and, by opening the mold 10 into left and right mold halves after molding the preform 2 into the liquid container C, the liquid container C may be removed from the mold 10.

Above the mold 10, there is provided a nozzle unit 20, which is configured to supply the pressurized liquid L into the preform 2. The nozzle unit 20 includes a body block 21.

The body block 21 is provided, in a lower end thereof, with a support block 22. The support block 22 supports a blow nozzle 23, which is attached to the lower end of the body block 21. The blow nozzle 23 is formed in substantially a cylindrical shape and has a lower end portion defined as a liquid supply port 23a. The body block 21, the support block 22, and the blow nozzle 23 constitute a nozzle unit body 20a. The nozzle unit body 20a is displaceable in a vertical direction relative to the mold 10. When the nozzle unit body 20a descends to a lowermost stroke end thereof, the nozzle unit body 20a (or, more concretely, the blow nozzle 23) comes into sealing engagement from above to the mouth 2a of the preform 2, which is placed in the mold 10.

The nozzle unit body 20a (or, more concretely, the body block 21 and the blow nozzle 23) is provided, inside thereof, with a longitudinal flow path 24, which terminates at the liquid supply port 23a of the blow nozzle 23. The longitudinal flow path 24 extends in the vertical direction. In the present embodiment, a liquid supply path, which terminates at the liquid supply port 23a, is constituted by the longitudinal flow path 24 and a liquid supply port 25, a third liquid pipe PL3, and a second liquid pipe PL2, which are described later. In other words, the termination of the liquid supply path and the termination of the longitudinal flow path 24 are both located at the liquid supply port 23a.

The nozzle unit body 20a (or, more concretely, the body block 21) is provided with the liquid supply port 25, which communicates to an upper end of the longitudinal flow path 24.

The blow nozzle 23 is provided, on an upper surface thereof, with a sealing surface 23b, which has a conical shape tapering downward. Additionally, the shape of the sealing surface 23b may be changed as appropriate. The sealing surface 23b may be defined by an inner circumferential surface of the blow nozzle 23 or by an upper surface and the inner circumferential surface of the blow nozzle 23. Inside the longitudinal flow path 24, there is positioned a sealing body 26, which may be seated against the sealing surface 23b. The sealing body 26 is formed in a cylindrical shape and has a lower end provided with a tapered surface 26a, which has a conical shape tapering downward. Additionally, the position and shape of the tapered surface 26a may be changed as appropriate. The sealing body 26 is configured, when being displaced to a closing position, that is, the lowermost stroke end position, to seat the tapered surface 26a against the sealing surface 23b to close the longitudinal flow path 24. On the other hand, when the sealing body 26 is displaced upward from the closing position, the tapered surface 26a of the sealing body 26 lifts off from the sealing surface 23b to open the longitudinal flow path 24.

As illustrated in FIG. 1, the sealing body 26 is fixed to a shaft body 27, which is provided in a manner such that the shaft body 27 is displaceable in the vertical direction relative to the nozzle unit body 20a, so that the sealing body 26 is displaceable in the vertical direction inside the longitudinal flow path 24. Additionally, the sealing body 26 may be formed integrally with the shaft body 27.

The nozzle unit 20 includes a discharge rod 28, which includes a discharge port 28a for the liquid L. The discharge rod 28 includes an opening-closing body 28b, which is configured to open and close the discharge port 28a. In the present embodiment, the discharge rod 28 includes a cylindrical-shaped outer tube 29, which has a lower end provided with the discharge port 28a, and an opening-closing body 28b, which is displaceable in the vertical direction relative to the outer tube 29. The opening-closing body 28b includes a cylindrical-shaped opening-closing rod 30, which extends on an inner side of the outer tube 29 in a radial direction along an axial center of the outer tube 29, and a large-diameter portion 31, which has a diameter larger than that of the opening-closing rod 30 and which is configured to abut against and separate from the discharge port 28a in the vertical direction. Between the outer tube 29 and the opening-closing body 28b, an in-cylinder flow path 28c is defined. The outer tube 29 may have a tubular shape (such as an elliptic cylinder shape or a polygonal tubular shape) other than the cylindrical shape. Furthermore, the opening-closing rod 30 may also have a columnar shape (such as an elliptic columnar shape or a polygonal columnar shape) other than the cylindrical shape. The outer tube 29 and the opening-closing rod 30 may be formed by a steel material or the like. Although, in the present embodiment, the discharge port 28a is provided at the lower end of the outer tube 29, the discharge port 28a may be provided at, instead of or in addition to the lower end, an outer circumferential surface of the outer tube 29. The number and shape of the discharge port 28a to be provided in the discharge rod 28 may also be changed as appropriate. Furthermore, although in the present embodiment the discharge rod 28 is configured to open and close the discharge port 28a, the discharge rod 28 may include the discharge port 28a, which is always open.

The discharge rod 28 penetrates the sealing body 26 and extends along an axial center of the sealing body 26 and the shaft body 27. The discharge rod 28 is displaceable in the vertical direction relative to the sealing body 26. The outer tube 29 and the opening-closing body 28b are driven individually or cooperatively by a driving source which is not illustrated.

The discharge rod 28 is used as a stretching rod which, by being displaced downward, stretches the preform 2 in an axial direction. The discharge rod 28, however, does not need to be used as the stretching rod. Additionally, only the opening-closing body 28b may be used as the stretching rod.

The discharge port 28a is connected to one end of a first liquid pipe PL1 via the in-cylinder flow path 28c, which is defined by a hollow within the discharge rod 28. The first liquid pipe PL1 is provided with a first liquid-pipe valve VL1, which is configured to open and close the first liquid pipe PL1. The first liquid-pipe valve VL1 is configured by a solenoid valve and controlled to open and close by a control unit which is not illustrated. The first liquid pipe PL1 is provided with a first liquid-pipe pressure-gauge 32, whose measurement data is inputted to the aforementioned control unit. The first liquid pipe PL1 is connected, at another end thereof, to a liquid drawing source 33 via the second liquid pipe PL2. Thus, in the present embodiment, the discharge port 28a is connected to the liquid drawing source 33 by a discharge path constituted by the in-cylinder flow path 28c, the first liquid pipe PL1, and the second liquid pipe PL2.

In the present embodiment, the liquid drawing source 33 and a pressurized liquid supply source 34, which is described later, are configured in common by a pump 35, which is operable in both pressurizing (i.e., positive) and drawing (i.e., opposite) directions. Although the pump 35 in the present embodiment is configured as a plunger pump including a cylinder 35a and a piston (i.e., plunger) 35b, any other type of pump may be used.

The other end of the first liquid pipe PL1 is also connected to the liquid supply port 25 via the third liquid pipe PL3. The third liquid pipe PL3 is provided with a third liquid-pipe pressure-gauge 36, whose measurement data is inputted to the aforementioned control unit. Thus, the pressurized liquid supply source 34 is connected to the liquid supply path constituted by the longitudinal flow path 24, which terminates at the liquid supply port 23a, the liquid supply port 25, the third liquid pipe PL3, and the second liquid pipe PL2.

Although in the present embodiment the liquid drawing source 33 and the pressurized liquid supply source 34 are configured in common by the pump 35, the liquid drawing source 33 and the pressurized liquid supply source 34 may be configured by separate pumps. In this case, the discharge path connecting the liquid drawing source 33 to the discharge port 28a and the liquid supply path connected to the pressurized liquid supply source 34 are supposed to be independent from each other.

The pressurized liquid supply source 34 is connected to a tank 37 via a fourth liquid pipe PL4. The tank 37 may be configured to contain the liquid L and to heat the liquid L to a predetermined temperature and maintain the liquid L at the temperature. The fourth liquid pipe PL4 is provided with a first liquid-pipe valve VL4, which is configured to open and close the fourth liquid pipe PL4. The fourth liquid-pipe valve VL4 is configured by a solenoid valve and controlled to open and close by the aforementioned control unit.

The blow nozzle 23 is provided, in a portion thereof that is located on a downstream side of the sealing surface 23b, with a gas supply port 23c, which is connected to the pressurized gas supply source 38. Although in the present embodiment the gas supply port 23c is provided at the inner circumferential surface of the blow nozzle 23, the gas supply port 23c may be provided at any portion (e.g., a lower end surface) of the blow nozzle 23 other than the inner circumferential surface. Inside the blow nozzle 23 and the support block 22, there is provided a gas supply path 39, which has one end that terminates at the gas supply port 23c. In the present embodiment, the gas supply path 39 extends in a horizontal direction. The shape of the gas supply path 39, however, may be changed as appropriate. The gas supply path 39 is connected, at another end thereof, with one end of a second air pipe PA2 via a first air pipe PAL The second air pipe PA2 is connected, at another end thereof, with the pressurized gas supply source 38. The second air pipe PA2 is also connected, at the one end thereof, with one end of a fourth air pipe PA4 via a third air pipe PA3. The fourth air pipe PA4 is connected, at another end thereof, with a drawing source 40. The fourth air pipe PA4 is also connected, at the one end thereof, with one end of a fifth air pipe PA5. The fifth air pipe PA5, at another end thereof, is exposed to the atmosphere. The drawing source 40 may be configured by a drawing pump or the like. The pressurized gas supply source 38 may be configured by a pressurizing pump or the like. The drawing source 40 and the pressurized gas supply source 38 may also be configured by a drawing-and-pressurizing pump (e.g., a plunger pump similar to the pump 35) that incorporates the drawing pump and the pressurizing pump.

The first through the fifth gas pipe PA1 through PA5 are respectively provided with first through the fifth air-pipe valve VA1 through VA5, which are configured to open and close the first through the fifth gas pipe PA1 through PA5. The first through the fifth air-pipe valve VA1 through VA5 are each configured by a solenoid valve and controlled to open and close by the aforementioned control unit.

Figure 2:
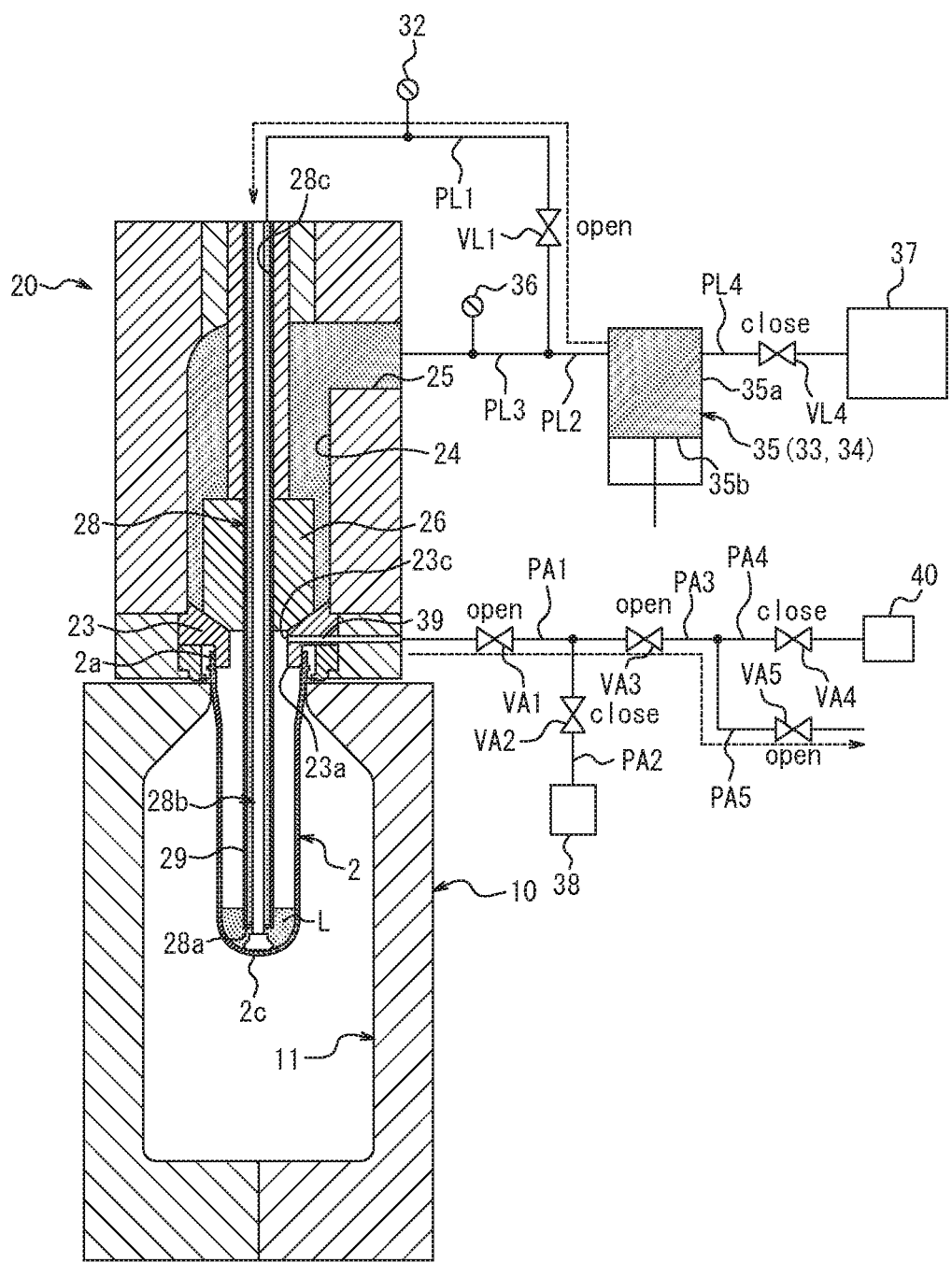
FIG. 2 illustrates the liquid container manufacturing apparatus in an air-discharge step.
Figure 5:
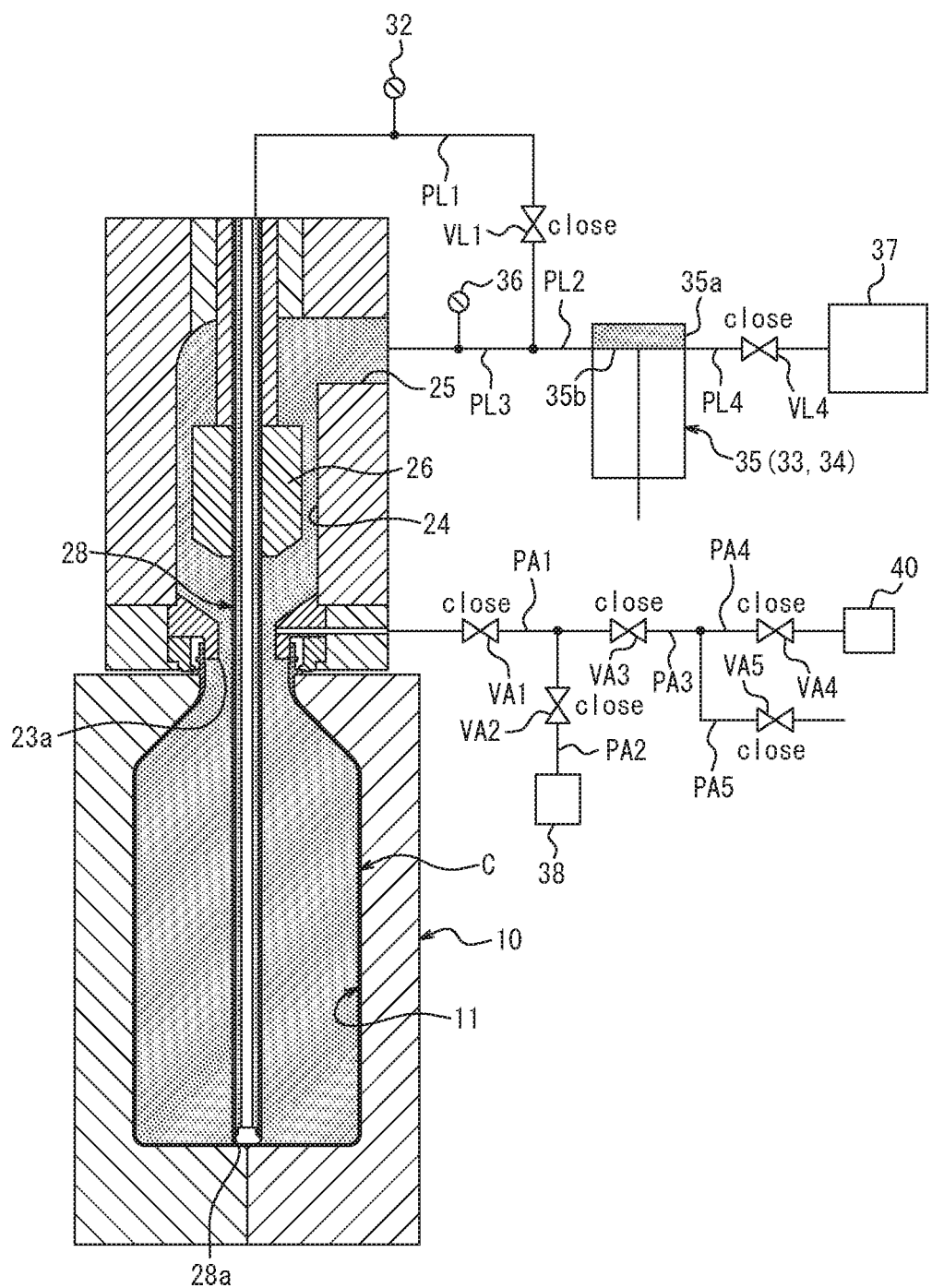
FIG. 5 illustrates the liquid container manufacturing apparatus upon completion of the liquid blow molding step and the rod stretching step.
Figure 6:
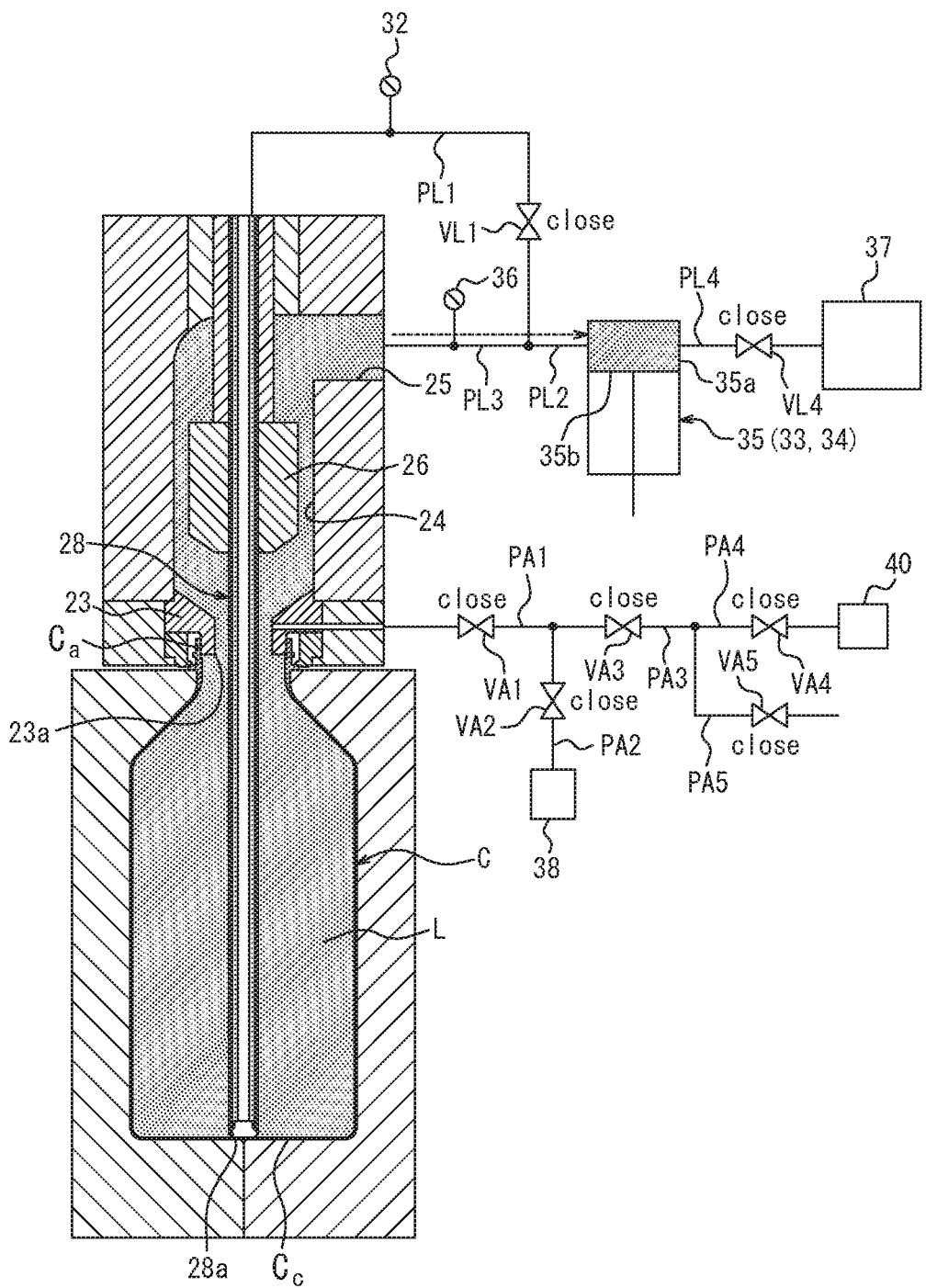
FIG. 6 illustrates the liquid container manufacturing apparatus in a depressurizing step.
Figure 7:
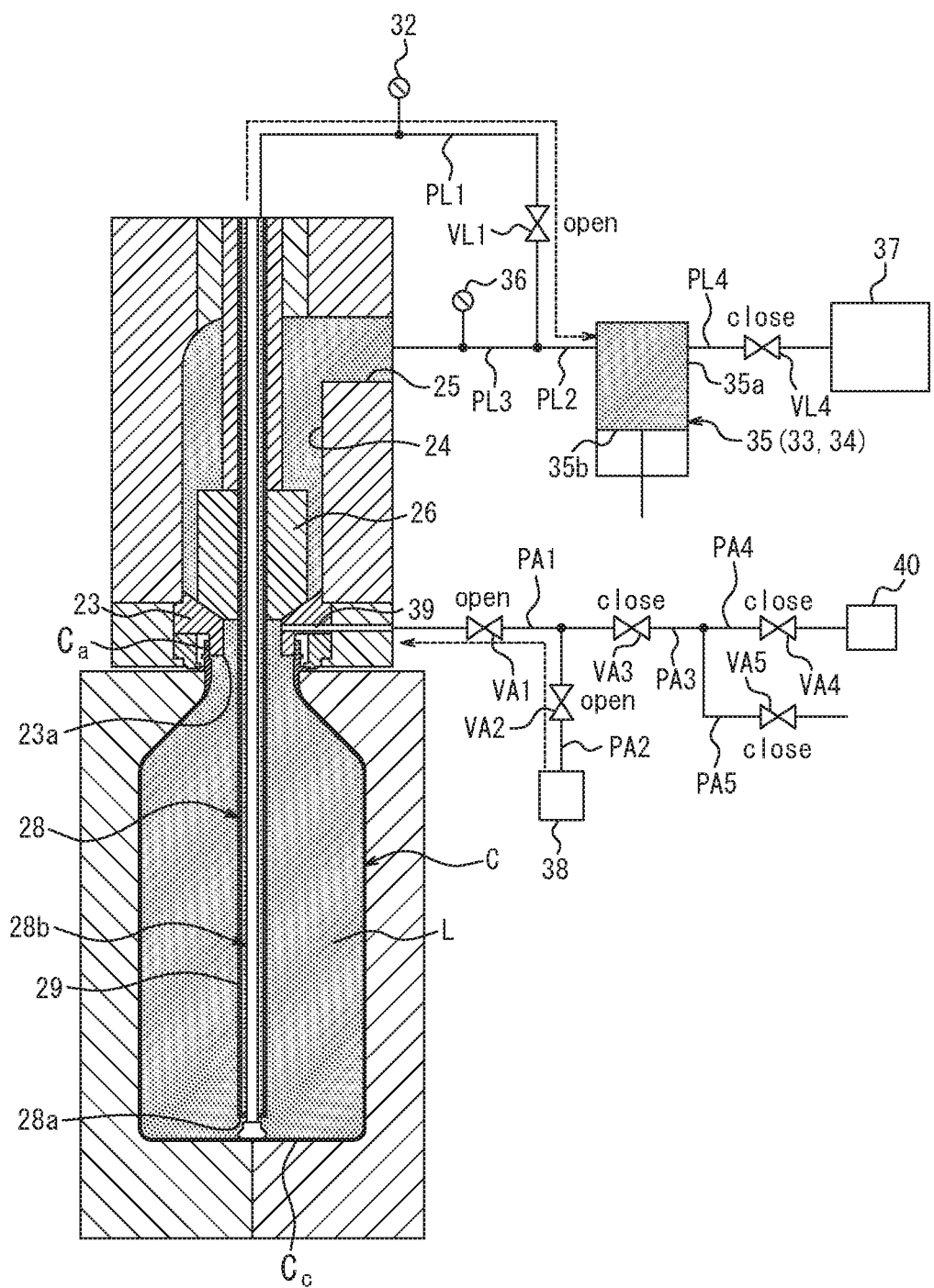
FIG. 7 illustrates the liquid container manufacturing apparatus in a headspace formation step (when a pressurized gas is being supplied)
Figure 8:
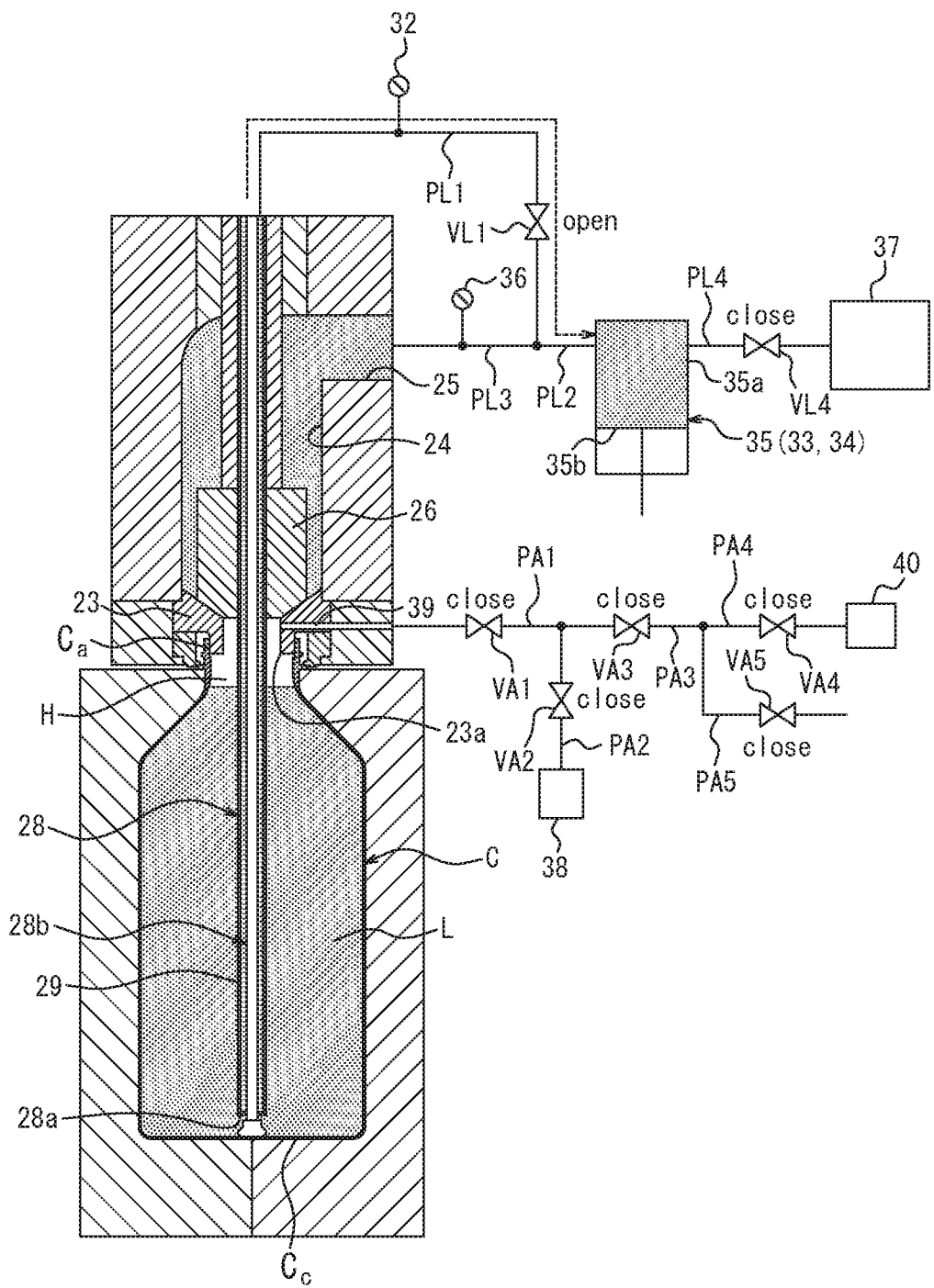
FIG. 8 illustrates the liquid container manufacturing apparatus in the headspace formation step (when supply of the pressurized gas has been stopped)
Figure 9:
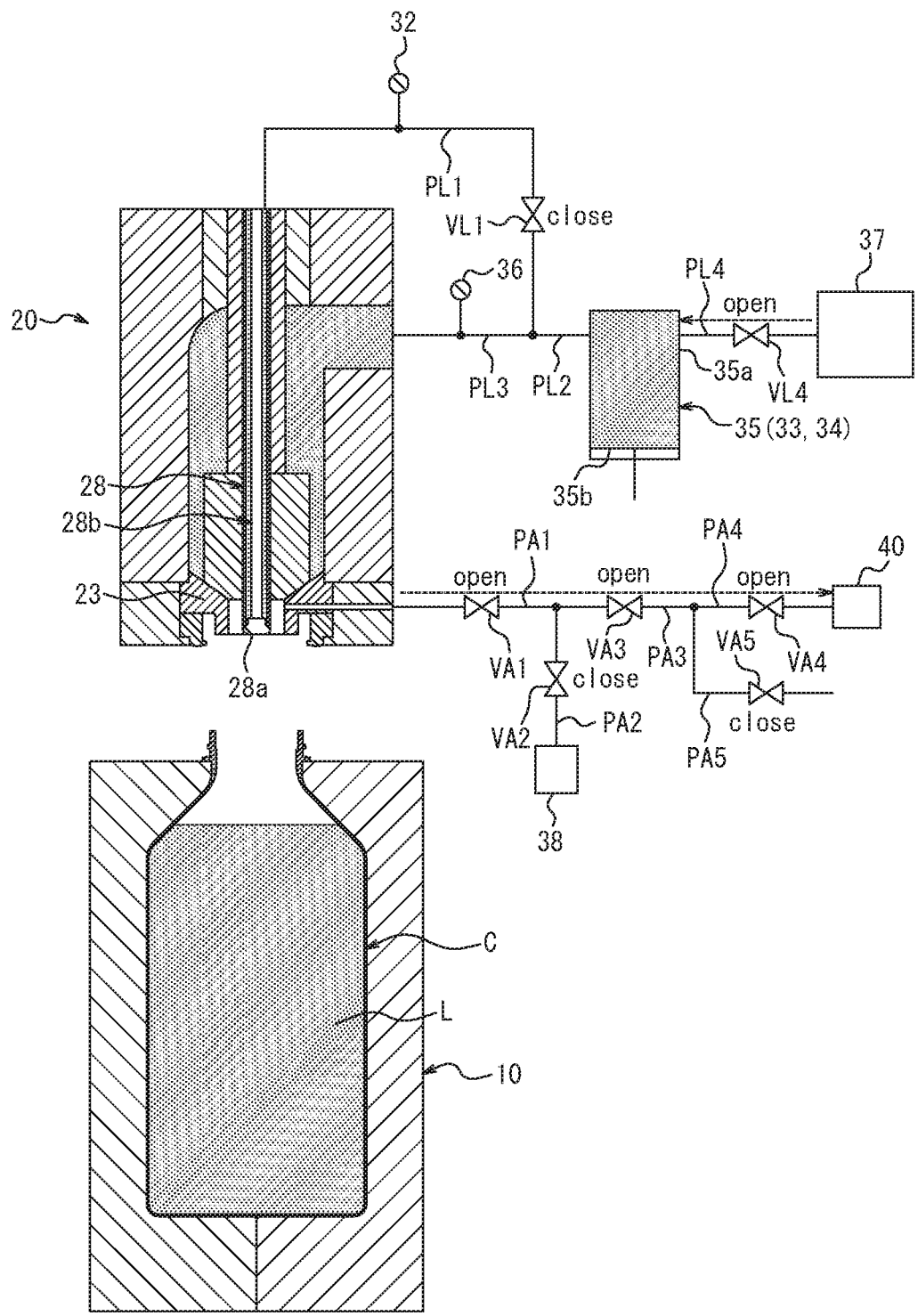
FIG. 9 illustrates the liquid container manufacturing apparatus in a rod-ascending and drawing step.

A gas flow path is constituted by the gas supply path 39 and the first through the fifth air pipe PA1 through PA5 and may be switched, in response to the first through the fifth air-pipe valve VA1 through VA5 being opened and closed, among a pressurizing state as illustrated in FIG. 7, a closed state as illustrated in FIGS. 3 to 6 and 8, an open-to-atmosphere state as illustrated in FIG. 2, and a drawing state as illustrated in FIGS. 1 and 9. Concretely, the gas flow path is brought into the pressurizing state when the first and the second air-pipe valve VA1 and VA2 are opened and the third through the fifth air-pipe valve VA3 through VA5 are closed. The gas flow path is also brought into the closed state when the first through the fifth air-pipe valve VA1 through VA5 are closed. The gas flow path is brought into the open-to-atmosphere state when the first, the third, and the fifth air-pipe valves VA1, VA3, and VA5 are opened and the second and the fourth air-pipe valves VA2 and VA4 are closed. The gas flow path is brought into the drawing state when the first, the third, and the fourth air-pipe valves VA1, VA3, and VA4 are opened and the second and the fifth air-pipe valves VA2 and VA5 are closed. Part or the entirety of the gas flow path may be defined within (the nozzle unit body 20a of) the nozzle unit 20.

As illustrated in FIGS. 1 and 9, bringing the gas flow path into the drawing state prevents dripping of the liquid remaining in a portion of the blow nozzle 23 that is located below the sealing surface 23b. When the liquid L is unlikely to drip or when the dripping may be tolerated, the gas flow path does not need to be brought into the drawing state, and the fourth air pipe PA4 and the drawing source 40 may be omitted.

As illustrated in FIG. 2, by opening the discharge port 28a of the discharge rod 28 at the bottom 2c of the preform 2 and by operating the pump 35 (i.e., the pressurized liquid supply source 34) in the pressurizing direction in a state in which the blow nozzle 23 is in sealing engagement to the mouth 2a of the preform 2, which is placed in the mold 10, and in which the sealing body 26 closes the longitudinal flow path 24, the liquid L is supplied into the preform 2 from the pressurized liquid supply source 34 via the second liquid pipe PL2, the first liquid pipe PL1, the in-cylinder flow path 28c, and the discharge port 28a. At this time, the fourth liquid-pipe valve VL4 is closed, and the first liquid-pipe valve VL1 is opened, and the gas flow path is in the open-to-atmosphere state. Since the gas flow path is in the open-to-atmosphere state, in conjunction with the supply of the liquid L into the preform 2, air is discharged to the atmosphere out of the preform 2 via the gas flow path. Additionally, to discharge air, the gas flow path may also be brought into the drawing state, instead of brought into the open-to-atmosphere state as described above. In this case, air may be drawn in from the inside of the preform 2 prior to the supply of the liquid L into the preform 2, or simultaneously with or during the course of the supply.

Figure 4:
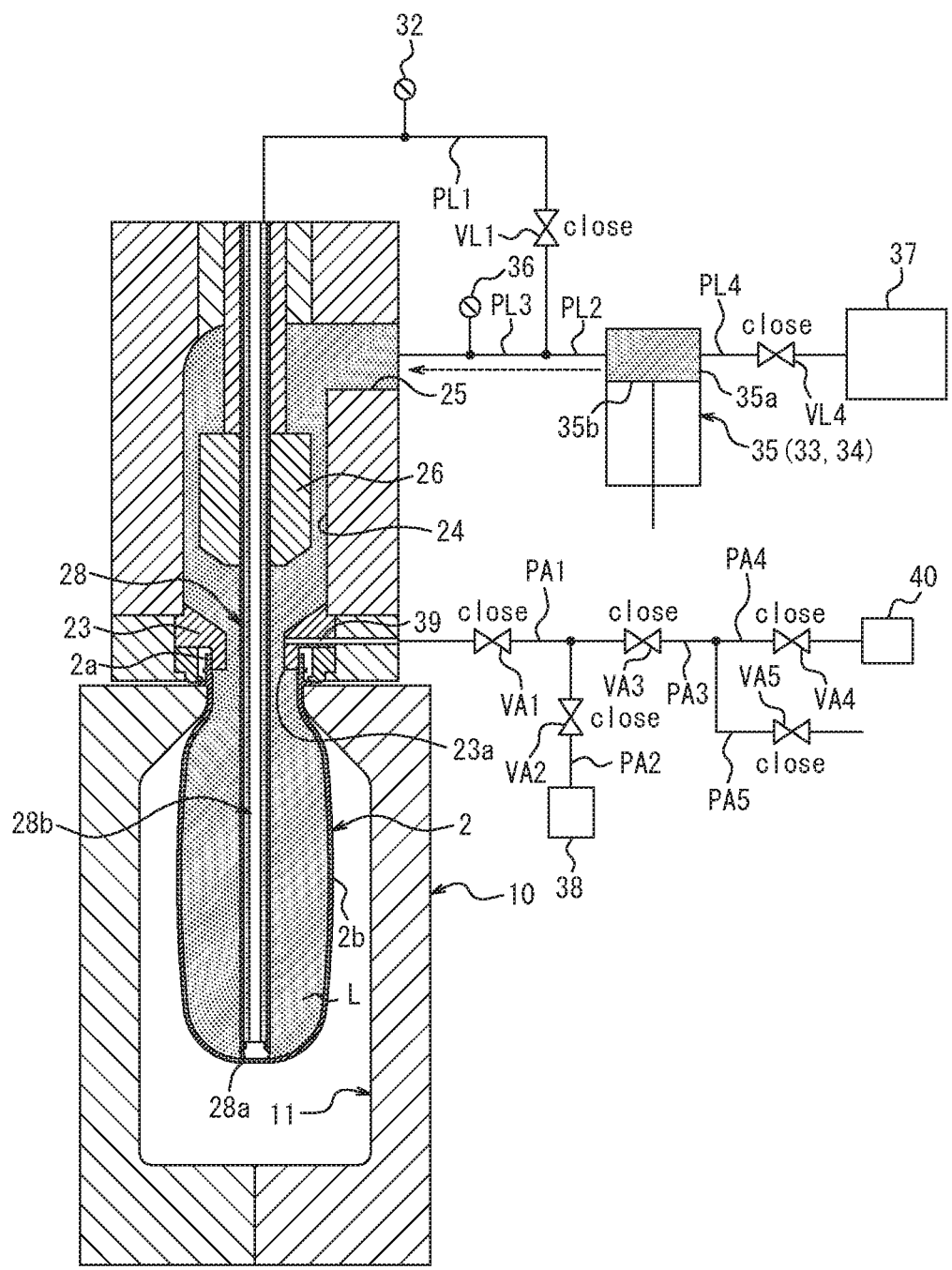
FIG. 4 illustrates the liquid container manufacturing apparatus in a liquid blow molding step and a rod stretching step.

As illustrated in FIG. 4, by operating the pump 35 (i.e., the pressurized liquid supply source 34) in the pressurizing direction in a state in which the blow nozzle 23 is in sealing engagement to the mouth 2a of the preform 2, which is placed in the mold 10, and in which the sealing body 26 opens the longitudinal flow path 24, the pressurized liquid L is supplied into the preform 2 through the second liquid pipe PL2, the third liquid pipe PL3, the liquid supply port 25, and the longitudinal flow path 24. At this time, the fourth liquid-pipe valve VL4 is closed, the first liquid-pipe valve VL1 is closed, the discharge port 28a is closed, and the gas flow path is in the closed state. Supplying the pressurized liquid L in this way allows the preform 2 to be molded into the liquid container C, which has a shape conforming to the cavity 11 of the mold 10.

As illustrated in FIG. 6, by operating the pump 35 (i.e., the pressurized liquid supply source 34) in the drawing direction in a state in which the liquid container C has been molded and in which the sealing body 26 opens the longitudinal flow path 24, the liquid L inside the liquid container C is discharged through the liquid supply port 23a toward the pressurized liquid supply source 34, thereby promptly cancelling the high-pressure state inside the liquid container C and inside the liquid supply path. At this time, the fourth liquid-pipe valve VL4 is closed, and the first liquid-pipe valve VL1 is closed. Furthermore, the gas flow path remains in the closed state until the high-pressure state inside the liquid container C is cancelled due to thus discharged liquid L, thereby preventing the liquid L from entering the gas flow path.

As illustrated in FIG. 7, by opening the discharge port 28a of the discharge rod 28 at a bottom Cc of the liquid container C and by operating the pump 35 (i.e., the liquid drawing source 33) in the drawing direction in a state in which the blow nozzle 23 is in sealing engagement to a mouth Ca of the liquid container C and in which the sealing body 26 closes the longitudinal flow path 24, the liquid L inside the liquid container C is discharged through the discharge port 28a toward the liquid drawing source 33. At this time, the fourth liquid-pipe valve VL4 is closed, and the first liquid-pipe valve VL1 is closed. Furthermore, the gas flow path is in the pressurizing state. Accordingly, a pressurized gas is supplied into the preform 2 through the gas supply port 23c, thereby accelerating or assisting the discharge of the liquid L through the discharge port 28a and reducing time required for forming a headspace H. Such assist by the pressurized gas is effective especially when the liquid L as the content liquid has a high viscosity.

In regards to the supply of the pressurized gas into the preform 2 that is accomplished by bringing the gas flow path into the pressurizing state, too small a supply amount thereof will fail to cause a predetermined amount of the liquid L to be discharged out of the preform 2. This will result in variation in the amount to be contained in the liquid container C. On the other hand, too large a supply amount of the pressurized gas will increase a pressure inside the liquid container C, thereby possibly causing the liquid L to squirt from the mouth Ca when the nozzle unit 20 ascends. In view of the above, the gas flow path is configured to be switched, when the pressure (i.e., a value detected by the first liquid-pipe pressure-gauge 32) of the discharge path has increased to a set value (e.g., a value corresponding to approximately 10% of a supply pressure of the pressurized gas caused by the pressurized gas supply source 38), from the pressurizing state to the closed state, so that the supply of the pressurized gas by the pressurized gas supply source 38 will be stopped.

Operations of the nozzle unit body 20a, the sealing body 26, the discharge rod 28, the pump 35 (i.e., plunger 35b), the first liquid-pipe valve VL1, the fourth liquid-pipe valve VL4, the first through the fifth air-pipe valve VA1 through VA5, the pressurized gas supply source 38, the drawing source 40, and the like are subject to integrated control by the aforementioned control unit which is not illustrated.

Subsequently, a description is given of a method (i.e., liquid container manufacturing method according to the present embodiment) for molding, from the synthetic resin preform 2, the liquid container C, in which the (content) liquid L is contained in a container having a predetermined shape, by using the liquid container manufacturing apparatus 1 configured as above.

As illustrated in FIG. 10, the present embodiment includes a standby step S1, an air discharge step S2, a liquid blow molding step S3, a depressurizing step S4, a headspace formation step S5, and a rod-ascending and drawing step S6, which are performed in this order.

Firstly, the standby step S1 is performed. In the standby step S1, as illustrated in FIG. 1, the nozzle unit 20 is positioned above and off the mold 10, the sealing body 26 closes the longitudinal flow path 24, and the discharge port 28a of the discharge rod 28 is closed. Furthermore, the gas flow path is in the drawing state.

In the standby step S1, the preform 2, which has been heated to a predetermined temperature (e.g., 80° C. to 150° C.) around which stretchability is achieved by using a heating unit (which is not illustrated), such as a heater, is placed in the mold 10, and the mold 10 is closed. At this time, the mouth 2a of the preform 2 is open, and the preform 2 is filled with air.

Figure 3:
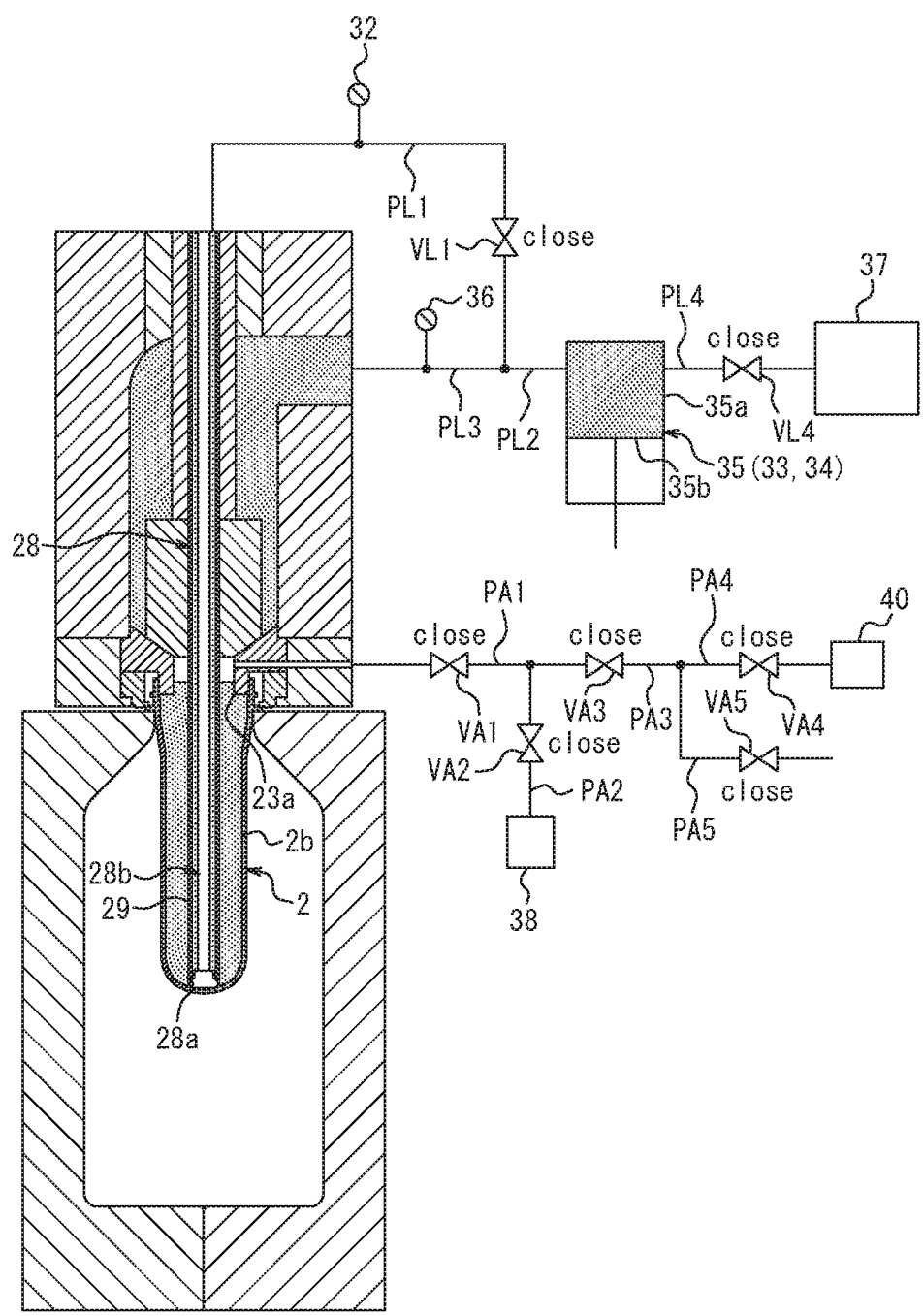
FIG. 3 illustrates the liquid container manufacturing apparatus upon completion of the air-discharge step.

Subsequently, the air discharge step S2 is performed in the present embodiment. In the air discharge step S2, as illustrated in FIG. 2, the nozzle unit 20 is caused to descend to engage the blow nozzle 23 to the mouth 2a of the preform 2, the gas flow path is brought into the open-to-atmosphere state, the sealing body 26 still closes the longitudinal flow path 24, and the discharge rod 28 is caused to descend to open the discharge port 28a at the bottom 2c of the preform 2. Under this state, the plunger 35b is operated at a first rate (i.e., at a first pressure) in the pressurizing direction to supply the liquid L into the preform 2 through the discharge port 28a, thereby causing air inside the preform 2 to be discharged to the atmosphere (i.e., outside) through the gas flow path. This means that, by supplying the liquid L into the preform 2, a majority of air filling the preform 2 is pushed out to the outside by the liquid L and so discharged. The discharge port 28a is opened, for example, by causing the outer tube 29 to ascend with respect to the opening-closing body 28b in a state in which a lower end of the opening-closing body 28b is in abutment against or in close contact with the bottom 2c. Once the discharge of air is completed, as illustrated in FIG. 3, the discharge port 28a is closed, and the gas flow path is brought into the closed state. Additionally, instead of discharging air through the gas flow path, an air discharge path may be secured by not engaging the blow nozzle 23 to the mouth 2a of the preform 2. The first rate in the air discharge step S2 is preferably set to a level that does not substantially allow the preform to be stretched (or expanded).

Thus, in the air discharge step S2, the liquid L is not supplied by causing the sealing body 26 to open the longitudinal flow path 24 but supplied through the discharge port 28a of the discharge rod 28. The result is that the liquid L is prevented from entering the gas supply port 23c, which is provided on the inner circumferential surface of the blow nozzle 23, and that air is smoothly discharged out of the preform 2 through the gas flow path. Furthermore, since in the air discharge step S2 the liquid L is supplied L in the state in which the discharge port 28a is positioned at the bottom 2c of the preform 2, the discharge port 28a is immersed in the liquid L immediately after the liquid L is supplied, and the liquid L may be supplied therefrom. This effectively prevents air entrainment, a cause of bubbling or the like of the liquid L, which is filled inside the preform 2. Due to the entrainment prevention, air is prevented from mixing into the liquid L inside the liquid container C, which is to be formed by the liquid blow molding step S3, thereby allowing stable formation of the headspace H having a predetermined dimension in the headspace formation step S5. Furthermore, the entrainment prevention reduces the amount of air bubbles to be contained in the liquid L when the liquid L is returned into the nozzle unit 20 in the headspace formation step S5, thereby also preventing air from mixing into the liquid supply path. This leads to improvement in stability of molding conditions, moldability of the container, etc.

The air discharge step S2 may be, however, performed by supplying the liquid L by causing the sealing body 26 to open the longitudinal flow path 24, instead of by supplying the liquid L through the discharge port 28a of the discharge rod 28 as described above. The air discharge step S2 may also be omitted.

Once the air discharge step S2 is completed, the liquid blow molding step S3 is subsequently performed. In the liquid blow molding step S3, as illustrated in FIG. 4, in a state in which the blow nozzle 23 is engaged to the mouth 2a of the preform 2, the sealing body 26 is caused to open the longitudinal flow path 24, and the liquid L, which has been pressurized to a second pressure larger than the first pressure, is supplied into the preform 2 through the liquid supply port 23a by the pressurized liquid supply source 34. Consequently, as illustrated in FIG. 5, the preform 2 is molded into the liquid container C, which has a shape conforming to the cavity 11 of the mold 10. Additionally, although in the present embodiment the discharge port 28a is closed in the liquid blow molding step S3, the discharge port 28a may be open so that the liquid L may be filled further through the discharge port 28a. After the liquid container C has been thus molded, the depressurizing step S4, which is described later, is performed.

In the present embodiment, as illustrated in FIGS. 3 and 4, a rod stretching step is performed during the course of the liquid blow molding step S3. In the rod stretching step, the trunk 2b of the preform 2 is stretched in the axial (i.e., longitudinal) direction by the discharge rod 28 (i.e., stretching rod), which is configured to be displaced and advanced downward. In the present embodiment, the discharge rod 28 descends, with the discharge port 28a being closed. The rod stretching step may also be performed prior to the liquid blow molding step S3. Performing the liquid blow molding step S3 after or during the course of the rod stretching step (it is to be noted that the rod stretching step may be started after the start of the liquid blow molding step S3) allows biaxial stretch blow molding in which the preform 2 is blow molded while being stretched in the axial direction by the stretching rod, thereby permitting the preform 2 to be molded into the liquid container C with the predetermined shape with even higher accuracy. The liquid blow molding step S3 may be, however, performed without performing the rod stretching step. FIG. 1 illustrates a state in which the discharge rod 28 is in an original position. A lower end of the discharge rod 28, in the original position, does not need to be positioned at a height illustrated in FIG. 1 and may be positioned above or below the height.

Since the liquid blow molding step S3 is performed in a state in which the majority of air inside the preform 2 has been discharged to the outside through the air discharge step S2, the pressurized liquid L, when being supplied into the preform 2, is prevented from being entrained with air, whereby air is prevented form mixing into the liquid L inside the liquid container C.

Once the liquid blow molding step S3 is completed, the depressurizing step S4 is subsequently performed. As illustrated in FIG. 6, in the depressurizing step S4 in the present embodiment, the pressure inside the liquid container C is reduced by operating the pump 35 in the drawing direction in the state in which the sealing body 26 opens the longitudinal flow path 24. At this time, the gas flow path remains in the closed state. The depressurizing step S4 cancels the high-pressure state inside the liquid container C, thereby allowing the pressurized gas to be smoothly introduced into the liquid container C in the subsequent headspace formation step S5. For example, the pressure inside the liquid container C upon completion of the liquid blow molding step S3 may be +3 MPa (gauge pressure). Such a high-pressure state may be cancelled by performing the depressurizing step S4 of reducing the pressure inside the liquid container C until a value detected by the third liquid-pipe pressure-gauge 36, which is provided in the liquid supply path, reaches a range from −0.5 MPa to +0.5 MPa (more preferably, from −0.1 MPa to +0.1 MPa).

In the present embodiment, the depressurizing step S4, which is accomplished by drawing-in through the liquid supply port 23a, may be completed quickly. Additionally, when the liquid drawing source 33 and the pressurized liquid supply source 34 are configured by separate pumps or the like so that the discharge path and the liquid supply path are configured by independent systems, the depressurizing step S4 may be performed, for example, by opening the discharge port 28a of the discharge rod 28 and discharging the liquid L inside the liquid container C through the discharge port 28a to the liquid drawing source 33 while the sealing body 26 closes the longitudinal flow path 24. The depressurizing step S4 may also be omitted.

Once the depressurizing step S4 is completed, the headspace formation step S5 is subsequently performed. As illustrated in FIGS. 7 and 8, in the headspace formation step S5 in the present embodiment, the headspace H having a predetermined dimension is formed inside the liquid container C by suck-back, in which the liquid L is discharged out of the liquid container C through the discharge port 28a by opening the discharge port 28a of the discharge rod 28 and the first liquid-pipe valve VL1 and operating the pump 35 in the drawing direction. Suck-back as described above, in the present embodiment, is performed in the state in which the discharge port 28a is positioned at the bottom Cc of the liquid container C. This prevents air from mixing into the discharge path, which in turn prevents air from mixing into the liquid supply path. The liquid L may be, however, drawn out through the discharge port 28a in a state in which the discharge port 28a is positioned above the bottom Cc of the liquid container C. In this case as well, the liquid L is drawn out through the discharge port 28a, which is positioned below the liquid supply port 23a, and air is better prevented from mixing into the liquid supply path compared with the case in which the liquid L is drawn out through the liquid supply port 23a.

Furthermore, in the present embodiment, assist by the pressurized gas is provided to reduce time required for suck-back through the discharge port 28a that is accomplished by operating the pump 35 in the drawing direction. Concretely, in the headspace formation step S5, the gas flow path is switched from the closed state to the pressurizing state. Since in the present embodiment the high-pressure state inside the liquid container C has been cancelled through the aforementioned depressurizing step S4, the gas flow path is promptly switched to the pressurizing state to promptly introduce the pressurized gas into the liquid container C through the gas supply port 23c. The discharge, by suck-back, of the liquid L through the discharge port 28a is therefore promptly assisted, and time required for the headspace formation step S5 is effectively reduced. The pump 35 may be operated in the drawing direction prior to, simultaneously with, or after the switching of the gas flow path to the pressurizing state.

Additionally, when the above-described depressurizing step S4 is omitted, the pressure inside the liquid container C may be made less than the pressure of the pressurizing gas by suck-back through the discharge port 28a, before switching the gas flow path to the pressurizing state to introduce the gas.

In the headspace formation step S5, it is important to control the amount of the pressurized gas to be supplied into the liquid container C. Concretely, as described earlier, too small a supply amount of the pressurized gas into the liquid container C will fail to cause a predetermined amount of the liquid L to be discharged out of the preform 2. This will result in variation in the amount to be contained in the liquid container C. On the other hand, too large a supply amount of the pressurized gas will increase the pressure inside the liquid container C, thereby possibly causing the liquid L to squirt from the mouth Ca when the nozzle unit 20 ascends in the later-described rod-ascending and drawing step S6.

In view of the above, in the present embodiment, the gas flow path is configured to be switched, when the value detected by the first liquid-pipe pressure-gauge 32 has increased to the set value, from the pressurizing state to the closed state, so that the supply of the pressurized gas by the pressurized gas supply source 38 will be stopped. At this time, the supply of the pressurized gas may be stopped instantaneously or gradually. The set value is set in advance to be an appropriate value corresponding to the viscosity of the liquid L, flow path resistance of the discharge path, and the like. The set value may be set in advance, for example, by test working prior to the manufacturing of the liquid container C. By thus monitoring the pressure in the discharge path and stopping the supply of the pressurized gas according to the pressure, the supply amount of the pressurized gas is better stabilized compared with a case in which, for example, the supply of the pressurized gas is stopped according to preset time. Accordingly, a discharge amount of the liquid L (i.e., volume of the headspace H) resulting from suck-back is also stabilized.

In addition to stopping the supply of the pressurized gas, the operation (i.e., suck-back operation) of the pump 35 in the drawing direction may be stopped when the value detected by the first liquid-pipe pressure-gauge 32 has changed to the set value. In this case, the discharge amount of the liquid L (i.e., volume of the headspace H) resulting from suck-back is even further stabilized. Furthermore, the pressure inside of the liquid container C is further stabilized after suck-back, thereby preventing such a defect as plastic deformation of the liquid container C due to excessively depressurized state generated inside the liquid container C. Additionally, the set value (i.e., second set value) used as a threshold for stopping the suck-back operation of the pump 35 may be equal to or different from the set value (i.e., first set value) used as a threshold for stopping the supply of the pressurized gas. The second set value may be smaller than the first set value. The second set value may be set within a range that causes the suck-back operation of the pump 35 to be stopped after the supply of the pressurized gas has been stopped. It is to be noted that the second set value does not necessarily need to be set within the above range. When the value detected by the first liquid-pipe pressure-gauge 32 at the start of the headspace formation step S5 (i.e., immediately after the depressurizing step S4) is A, the first set value and the second set value may be set within the range A≤second set value≤first set value and A<first set value. It is to be noted that the first set value and the second set value do not necessarily need to be set within the above range. A pressure-gauge other than the first liquid-pipe pressure-gauge 32 may also be provided in the discharge path, and the suck-back operation of the pump 35 may be stopped when a value detected by the provided pressure-gauge has changed to the second set value.

Additionally, although in the present embodiment both the first and the second air-pipe valves are closed to switch the gas flow path from the pressurizing state to the closed state, either one alone may be closed.

In the present embodiment, once the headspace formation step S5 is completed, the rod-ascending and drawing step S6 is performed. In the rod-ascending and drawing step S6, as illustrated in FIG. 9, the discharge port 28a and the first liquid-pipe valve VL1 are closed, and the discharge rod 28 is caused to ascend to return to the original position. Furthermore, while the gas flow path is brought into the drawing state to prevent liquid-dripping from the blow nozzle 23, the nozzle unit 20 is caused to ascend. At this time, the ascension of the nozzle unit 20 is preferably timed so that the inside of the liquid container C will not be excessively depressurized. The gas flow path may be brought into the drawing state after the nozzle unit 20 has been ascended. Subsequently, the fourth liquid-pipe valve VL4 is opened, and the plunger 35b of the pump 35 (i.e., pressurized liquid supply source 34) is operated in the drawing direction to fill the pressurized liquid supply source 34. Then, the liquid container C is removed from the mold 10, and the process moves to the standby step S1 illustrated in FIG. 1.

Needless to say, the present disclosure is not limited to the above embodiment, and various changes may be made without departing the gist of the present disclosure.

Although the above embodiment illustrates the case of implementing the present liquid container manufacturing method by using the liquid container manufacturing apparatus 1 with the configuration of FIG. 1, the present liquid container manufacturing method may be implemented by using a liquid container manufacturing apparatus or the like with any other configuration. Furthermore, even when a liquid container manufacturing apparatus not including the discharge rod 28 (it is to be noted, however, that the stretching rod may, but does not have to, be included) is used, and when suck-back is performed after blow molding by operating the pump in the drawing direction in a state in which the sealing body opens the blow nozzle to thereby form the headspace, the inside of the liquid container is prevented from falling into the excessively depressurized state by controlling (e.g., stopping) the operation of the pump in the drawing direction according to a value of the pressure gauges provided in the liquid supply path or the like. At this time, the operation of the pump in the drawing direction may be stopped instantaneously or gradually.

As the preform 2, any of those with various shapes may be used in accordance with the shape or the like of the molded liquid container C.

REFERENCE SIGNS LIST

1 Liquid container manufacturing apparatus
2 Preform
2a Mouth
2b Trunk
2c Bottom
10 Mold
11 Cavity
20 Nozzle unit
20a Nozzle unit body
21 Body block
22 Support block
23 Blow nozzle
23a Liquid supply port
23b Sealing surface
23c Gas supply port
24 Longitudinal flow path (liquid supply path)
25 Liquid supply port (liquid supply path)
26 Sealing body
26a Tapered surface
27 Shaft body
28 Discharge rod
28a Discharge port
28b Opening-closing body
28c In-cylinder flow path (discharge path)
29 Outer tube
30 Opening-closing rod 31 Large-diameter portion
32 First liquid-pipe pressure-gauge
33 Fluid drawing source
34 Pressurized liquid supply source
35 Pump
35a Cylinder
35b Piston
36 Third liquid-pipe pressure-gauge
37 Tank
38 Pressurized gas supply source
39 Gas supply path
40 Drawing source
C Liquid container
Ca Mouth
Cc Bottom
L (Content) liquid
PL1 First liquid pipe (discharge path)
PL2 Second liquid pipe (discharge path, liquid supply path)
PL3 Third liquid pipe (liquid supply path)
PL4 Fourth liquid pipe
PA1 through PA5 First through fifth air pipe
VL1 First liquid-pipe valve
VL4 Fourth liquid-pipe valve
VA1 through VA5 First through fifth air-pipe valve
H Headspace

The invention claimed is:

1. A liquid container manufacturing method for manufacturing, from a closed-bottom tubular-shaped preform, a liquid container containing a content liquid by using a nozzle unit and a mold,
the nozzle unit including:
a blow nozzle that defines a liquid supply port positioned at a termination of a liquid supply path connected to a pressurized liquid supply source;
a discharge rod including a discharge port connected to a liquid drawing source through a discharge path; and
a gas supply port that is provided in the blow nozzle and that is connected to a pressurized gas supply source,
the liquid container manufacturing method comprising:
a liquid blow molding step of molding the preform into the liquid container having a shape conforming to an inner surface of the mold, by supplying a pressurized liquid into the preform through the liquid supply port by the pressurized liquid supply source; and
a headspace formation step of forming a headspace in the liquid container, by discharging, in a state in which the liquid supply path is closed, the liquid out of the liquid container through the discharge port positioned below the liquid supply port, the discharge accomplished by drawing-in by the liquid drawing source, wherein
in the headspace formation step, a pressurized gas is supplied from the pressurized gas supply source into the liquid container through the gas supply port to thereby assist the discharge, by the drawing-in, of the liquid out of the liquid container through the discharge port, and, when a pressure in the discharge path has increased to a set value, the supply of the pressurized gas by the pressurized gas supply source is stopped.

2. The liquid container manufacturing method according to claim 1, wherein,
in the headspace formation step, when a value detected by a pressure gauge provided in the discharge path has increased to the set value, the supply of the pressurized gas by the pressurized gas supply source is stopped.

3. The liquid container manufacturing method according to claim 1, wherein
the pressurized liquid supply source is configured by a pump operable in both pressurizing and drawing directions, and
the liquid container manufacturing method further comprises a depressurizing step, performed between the liquid blow molding step and the headspace formation step, of reducing a pressure inside the liquid container, by operating the pump in the drawing direction in a state in which the liquid supply path is opened.

4. The liquid container manufacturing method according to claim 1, wherein
the pressurized liquid supply source and the liquid drawing source are configured in common by a pump operable in both pressurizing and drawing directions,
the liquid blow molding step is performed by operating the pump in the pressurizing direction, and
the headspace formation step is performed by operating the pump in the drawing direction.

5. The liquid container manufacturing method according to claim 4, wherein
the operation of the pump in the drawing direction in the headspace formation step is stopped according to the pressure in the discharge path.

6. The liquid container manufacturing method according to claim 1, wherein
the discharge rod is configured to open and close the discharge port,
the liquid blow molding step is performed in a state in which the discharge port is closed, and
the headspace formation step is performed in a state in which the discharge port is opened.

7. The liquid container manufacturing method according to claim 1, further comprising
a rod stretching step, performed at least one of during a course of the liquid blow molding step or prior to the liquid blow molding step, of stretching the preform in an axial direction by using the discharge rod as a stretching rod.

8. The liquid container manufacturing method according to claim 1, further comprising
an air discharge step, performed prior to the liquid blow molding step, of discharging air inside the preform to outside, by supplying the liquid into the preform.

9. The liquid container manufacturing method according to claim 1, wherein
the nozzle unit further includes a sealing body configured to open and close the liquid supply path,
the discharge rod penetrates the sealing body and is displaceable relative to the sealing body,
the liquid blow molding step is performed by causing the sealing body to open the liquid supply path, and
the headspace formation step is performed in a state in which the sealing body closes the liquid supply path.

* * * * *